(12) United States Patent
Nore et al.

(10) Patent No.: US 11,860,806 B2
(45) Date of Patent: Jan. 2, 2024

(54) MICROCONTROLLER SYSTEM WITH GPIOS

(71) Applicant: Nordic Semiconductor ASA, Trondheim (NO)

(72) Inventors: Anders Nore, Trondheim (NO); Ronan Barzic, Trondheim (NO); Fredrik Jacobsen Fagerheim, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/620,640

(22) PCT Filed: Jun. 19, 2020

(86) PCT No.: PCT/EP2020/067243
§ 371 (c)(1),
(2) Date: Dec. 17, 2021

(87) PCT Pub. No.: WO2020/260171
PCT Pub. Date: Dec. 30, 2020

(65) Prior Publication Data
US 2022/0300446 A1    Sep. 22, 2022

(30) Foreign Application Priority Data

Jun. 27, 2019 (GB) .................... 1909270

(51) Int. Cl.
*G06F 13/38* (2006.01)
*G06F 13/20* (2006.01)
*G06F 13/40* (2006.01)

(52) U.S. Cl.
CPC ............ *G06F 13/385* (2013.01); *G06F 13/20* (2013.01); *G06F 13/4022* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 8,990,455 B1 * | 3/2015 | Owen | ................. G06F 15/7867 710/24 |
| 2011/0157140 A1 * | 6/2011 | Piasecki | ............. G06F 3/04166 345/212 |

(Continued)

FOREIGN PATENT DOCUMENTS

| | | |
|---|---|---|
| EP | 2 509 001 A2 | 10/2012 |
| EP | 2 713 317 A1 | 4/2014 |

OTHER PUBLICATIONS

International Search Report and Written Opinion for PCT/EP2020/067243, dated Aug. 12, 2020, 12 pages.

(Continued)

*Primary Examiner* — Henry Tsai
*Assistant Examiner* — Aurangzeb Hassan
(74) *Attorney, Agent, or Firm* — Klarquist Sparkman, LLP

(57) ABSTRACT

A microcontroller system comprising a master microcontroller unit, a further module and a general purpose input/output. In a first state the general purpose input/output is controlled by the master microcontroller unit and in a second state the general purpose input/output is controlled by the further module. The master microcontroller unit is arranged to transmit a selection signal which changes the state of the general purpose input/output.

15 Claims, 3 Drawing Sheets

(56) References Cited

U.S. PATENT DOCUMENTS

| | | | |
|---|---|---|---|
| 2012/0260004 A1* | 10/2012 | Yakame | ............... G06F 13/409 710/17 |
| 2013/0080677 A1 | 3/2013 | Simmons | |
| 2014/0115205 A1* | 4/2014 | Jin | ..................... G06F 13/4022 710/74 |
| 2018/0181526 A1* | 6/2018 | Simmons | ............ G06F 13/4068 |

OTHER PUBLICATIONS

IPO Search Report under Section 17(5) for GB1909270.9, dated Mar. 12, 2020, 3 pages.

* cited by examiner

MICROCONTROLLER SYSTEM WITH GPIOS

CROSS REFERENCE TO RELATED APPLICATIONS

This is the U.S. National Stage of International Application No. PCT/EP2020/067243, filed Jun. 19, 2020, which was published in English under PCT Article 21(2), which in turn claims the benefit of Great Britain Application No. 1909270.9, filed Jun. 27, 2019.

This application relates to a microcontroller system, in particular a microcontroller system having a general purpose input/output.

In microcontroller systems, multiple microcontroller units are likely to be required. In previously known microcontroller systems, these multiple microcontroller units may share a plurality of general purpose input/output pins via components incorporated into the system such as multiplexers, asynchronous bridges and/or synchronous bridges. In other previous known microcontroller systems, the multiple microcontroller units may each have dedicated general purpose input/output pins (i.e. the general purpose input/output pins are not shared between the multiple microcontroller units).

Both of the systems known from the prior art have a number of disadvantages. Microcontroller systems in which multiple microcontroller units share a plurality of general purpose input/output pins are susceptible to errors caused by interference between multiple microcontroller units at a shared general purpose input/output or to malicious code introduced to one of the units. Moreover, to use synchronous bridges, all components in the system must be operating at the same frequency which is not desirable and often not possible if various microcontroller units are in different power domains. Asynchronous bridges also have inherent disadvantages associated with the required time synchronization. Microcontroller systems where microcontroller units have dedicated general purpose input/output pins can be comparatively expensive and complicated due to the large number of general purpose input/outputs required to be hardcoded to individual microcontroller system.

Therefore the Applicant has appreciated it would be advantageous to adapt the microcontroller systems to help to reduce the aforementioned disadvantageous associated with the prior art.

When viewed from a first aspect the present invention provides a microcontroller system comprising:
 a master microcontroller unit;
 a further module; and
 a general purpose input/output, wherein in a first state the general purpose input/output is controlled by the master microcontroller unit and in a second state the general purpose input/output is controlled by the further module;
wherein the master microcontroller unit is arranged to transmit a selection signal which changes the state of the general purpose input/output.

The skilled person will appreciate that owing to the master microcontroller unit being arranged to transmit a selection signal to change the state of the general purpose input/output, situations in which errors occur due to two modules trying to control of a general purpose input/output may be avoided.

In accordance with the present invention, the master microcontroller unit can dynamically change the state of the general purpose input/output (hereafter 'GPIO') to avoid situations in which a further module attempts to control the GPIO when the GPIO is already engaged by another module.

Embodiments of the present invention may be advantageous over previously known microcontroller systems as no asynchronous bridge is required. As asynchronous systems require time synchronisation, avoiding the use of an asynchronous bridge increases the speed of processing of changes in the module controlling the GPIO.

The master microcontroller unit may comprise a number of components such as a Universal Asynchronous Receiver/Transmitter (UART) and/or a serial interface. As such the master microcontroller may be used for a variety of different applications.

In a set of embodiments, the microcontroller system comprises a plurality of further modules. The plurality of further modules may be identical, or they may be different (e.g. different further modules have different application and thus are formed from different components).

In a set of embodiments, the further module is a slave microcontroller unit. Similarly to the master microcontroller unit, the slave microcontroller unit may also be used for a variety of applications e.g. the slave microcontroller unit may be a WiFi microcontroller, long-term evolution (LTE) microcontroller and/or audio synthesising/processing microcontroller. The slave microcontroller unit may comprise a number of components such as a UART and/or a radio.

In a set of embodiments, the microcontroller system comprises a plurality of slave microcontroller units. This may be advantageous in microcontroller systems that perform a variety of functions i.e. each slave microcontroller unit of the plurality may be used or configured for a different application. In a set of embodiments the microprocessor system comprises a plurality of GPIOs. It may be beneficial in such an embodiment for different slave microcontroller units to be assigned control of different GPIOs by the master microcontroller device, such that each unit in a subset of the plurality of slave microcontroller units can control a different GPIO simultaneously. This allows multiple, different applications to be run from the microcontroller system simultaneously, which is often required in systems on chips. Therefore, in a set of embodiments the selection signal assigns control of one of the plurality of GPIOs to one of a or the plurality of slave microcontroller units.

Whilst a plurality of GPIOs may be required when the system comprises a plurality of slave microprocessor units, the dynamic assignment of GPIOs by the master microprocessor unit allows a smaller number of GPIOs to be utilized in the microcontroller system as a whole and assigned to any given slave microprocessor unit at any given time. Having fewer GPIOs reduces the number of components exposed to unintentional bugs or malicious code, which may be introduced by a network or digital signal processor (DSP). Therefore whilst performing more dangerous applications, critical components of the system can be disconnected from the general purpose inputs/outputs, to avoid potential damage to the microprocessor unit.

To further improve security of the microcontroller system, in certain embodiments it may be desirable for a subset of the plurality of general purpose inputs/outputs to be excluded from control by a subset of the plurality of slave microcontroller units. This would mean that the subset of general purpose inputs/outputs could only be controlled by certain slave microcontroller units which may have e.g. additional security features.

In a set of embodiments, the microcontroller system is arranged such that the GPIO is in the first state upon start-up of the microcontroller system. In embodiments in which there are a plurality of GPIOs, all of these may initially be in the first state upon start-up of the microcontroller system. This may reduce start-up time of the microcontroller system as initially only the master microcontroller unit may need to be actively powered. It may also simplify the process of assigning GPIOs to slave microcontrollers that may require GPIO at different times after start-up. For example, certain applications involving certain slave microcontroller units may need to be initiated before other applications involving different slave microcontroller units. Therefore, in a set of embodiments the master microcontroller unit is arranged to transmit a selection signal which changes the state of the GPIO from the first state to the second state.

In a set of embodiments, the selection signal is written to a register field of the GPIO.

In a set of embodiments, when a GPIO is in the second state, the slave microcontroller unit is arranged to have sole control over the (assigned) GPIO. The slave microcontroller unit would therefore be able to configure the pull-up or down, drive-strength, wakeup-sensing and the input/output mode of the assigned GPIO. This prevents corruption of the signals sent from the slave microcontroller unit to the assigned GPIO, as there would be no interference of other microcontrollers attempting to control the assigned GPIO.

In order to provide greater functionality, in a set of embodiments the slave microcontroller unit comprises a peripheral. The peripheral may, for example, be a timer (e.g. a watchdog timer), event counter or pulse-width modulation generator. The advantages of the slave microcontroller comprising a peripheral can vary depending on the type of peripheral. For example, a watchdog timer peripheral can enable a slave microcontroller unit to detect and recover computer malfunctions, which increases the reliability of the microcontroller system and device in which the microcontroller system is implemented. In another example, using a pulse-width modulation (PWM) generator as a peripheral may allow the slave microcontroller to output a PWM signal. Overall, peripherals tend to increase the functions and applications of the microcontroller system.

As increasing the number of peripherals can increase the functions and applications of the microcontroller system, it may be advantageous for the slave microcontroller unit to comprise a plurality of peripherals. Considering the allowable permutations disclosed herein, it is possible to have a microcontroller system comprising a plurality of slave microcontroller units, wherein at least one of the slave microcontroller units comprises a plurality of peripherals.

For a peripheral to perform certain functions, it must be in control of a GPIO. The slave microcontroller unit is may therefore be arranged to assign the GPIO assigned to the slave microcontroller to its peripheral. Therefore in a set of embodiments, the slave microcontroller unit is arranged to transmit an additional selection signal which assigns the control of at least one GPIO to a peripheral. The peripheral may then control and access the GPIO in order to, for example, transmit a signal to another part of the microcontroller system.

There may also be embodiments in which the master microcontroller unit is arranged to transmit a selection signal that directly assigns a peripheral control of a GPIO. In such a configuration a slave microcontroller controller is not required to be assigned control of the GPIO first.

There may also be embodiments in which the further module is a peripheral not associated with a slave microcontroller unit. The skilled person will also appreciate that within the scope of the invention disclosed, there are embodiments in which the microcontroller system has a plurality of further modules, a subset of which are slave microcontroller units and a subset of which are peripherals.

The skilled person will appreciate that different slave microcontroller units may require control of GPIOs at different points during the functioning of the microcontroller system. For example, for certain applications a specific slave microcontroller unit may be required, but this specific slave microcontroller unit may not be required for a different application. Therefore it may be beneficial for the control of the GPIOs to be varied dynamically during the functioning of the microcontroller system. As such, in some embodiments of the invention the GPIO assignment is dynamic. Dynamic should be taken in this context to refer to the assignment of the GPIO actively occurring during functioning of the microcontroller system.

In a set of embodiments the GPIO is used as a clock connection and/or a data connection.

Whilst it is preferable in some of the embodiments described herein for a GPIO to only be controlled by a single microcontroller unit or peripheral at a given time, there may be embodiments in which the GPIO can be assigned to multiple microcontroller units and/or peripherals. This may increase the functionality of the microcontroller system.

An example of how access can be provided to more than one microcontroller unit or peripheral at any time is that the output path from each microcontroller unit/peripherals can be stopped by an array of AND gates. The array of AND gates would have one ENABLE input and one DATA input. The outputs from each array of AND gates may then be sent as an input into an OR tree. The final output is the output of the OR tree. Should multiple AND gates be open, then the one driving the value '1' will always control the final output.

When viewed from a second aspect, the present invention provides a method of controlling a microcontroller system comprising:
  controlling a general purpose input/output using a master microcontroller unit;
  transmitting a selection signal from the master microcontroller unit to a general purpose input/output; and
  subsequently controlling the general purpose input/output using a further module.

It will be appreciated that this method of controlling a microcontroller system is advantageous over methods known in the prior art for reasons previously described in relation to the first aspect of the invention. A person skilled in the art will also appreciate that similar embodiments as described in respect of the first aspect of the invention may also be applicable to the second aspect of the invention. The further module may be a slave microcontroller unit or a peripheral.

The skilled person will appreciate that an important factor in designing an microcontroller system is minimizing the time taken to start-up the system from a 'sleep', 'stand-by' or 'off' state. The start-up time can be reduced by initially only actively powering the master microcontroller unit, which may control a plurality of general input/output pins. Then, during the initial configuration, a selection signal is transmitted to assign the GPIOs to one or more further modules. Therefore, the method may further comprise a step of transmitting a selection signal to assign the GPIO occurs during an initial configuration.

In a set of embodiments, the method comprises assessing whether a further module is secure. This step may occur before the step of controlling of the GPIO using the further module. A further module may not be secure if it has been corrupted with errors or malicious code. Should the further module be determined not to be secure, then the step of controlling of the GPIO using the further module may not be implemented. This can prevent additional components on the microcontroller system also becoming corrupted, and thus decreases the risk of the system being compromised and failing.

A selection of embodiments of the present invention will now be described, by way of example only, with reference to the accompanying drawing in which.

Figure 1:
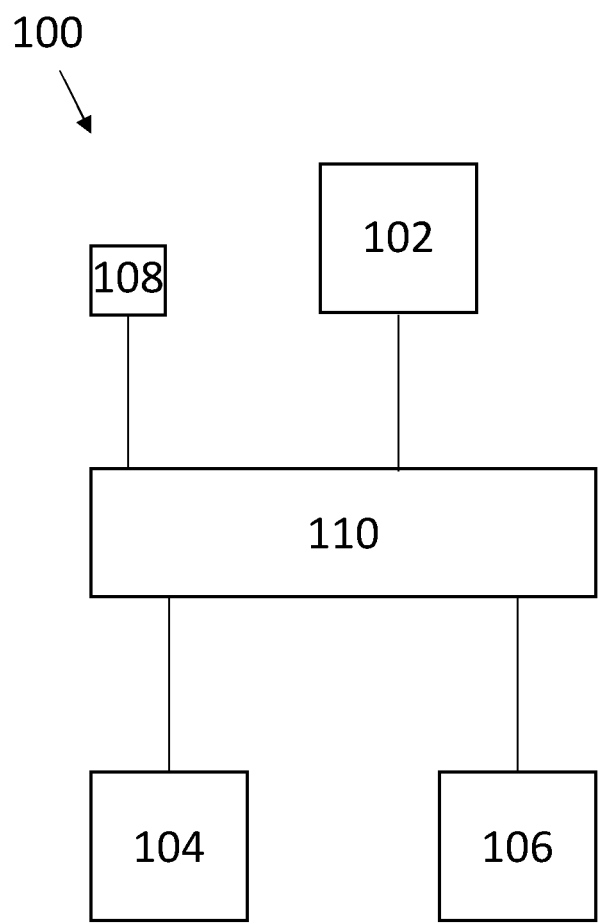
FIG. 1 shows a microcontroller system with a plurality of slave microcontroller units.

An exemplary microcontroller system 100 as shown in FIG. 1 comprises a master microcontroller unit 102 and a general purpose input/output (GPIO) 108. The microcontroller system 100 further comprises a first slave microcontroller unit 104 and a second slave microcontroller unit 106. The slave microcontroller units 104, 106, the master microcontroller unit 102 and GPIO 108 are connected via a bus 110. This allows signals to be transmitted between the different components of the microcontroller system 102.

In an initial state, for example, when the microcontroller system 100 is started up from a 'standby/OFF' state, the GPIO 108 is controlled by the master microcontroller unit 102, so that neither the first slave microcontroller unit 104 nor the second slave microcontroller unit 106 has control of the GPIO 108. As such, these components are initially inactive. After start-up, the microcontroller system 100 may then engage in an initial configuration. This initial configuration may be initiated by the master microcontroller unit 102. During initial configuration the master microcontroller unit 102 transmits a selection signal to the register field corresponding to the GPIO 108. This selection signal may indicate that the GPIO 108 is now to be controlled by the first slave microcontroller unit 104. The first slave microcontroller unit 104 may then begin communicating with and controlling the GPIO 108. The first slave microcontroller unit 104 begins communicating with and controlling the GPIO 108 as a result of reading the active configuration from the master microcontroller unit 102 through a generic microcontroller unit to microcontroller bus interface such as the bus 110 shown in FIG. 1. However, the first slave microcontroller 104 may only read the active configuration from the master microcontroller unit 102 at the discretion of the master microcontroller unit.

At a later point, for example when the second microcontroller unit is required to be actively functioning, the master microcontroller unit 102 transmits another, different selection signal to the register field corresponding to the GPIO 108. This selection signal indicates that the GPIO is now controlled by the second slave microcontroller unit 106. As such, the first slave microcontroller unit 104 ceases to communicate with and control the GPIO 108. The second slave microcontroller unit 106 instead begins to communicate with and control the GPIO 108. Using a selection signal transmitted by the master microcontroller unit 102 helps to avoid errors occurring due to the two slave microcontrollers 104, 106 trying to control the GPIO simultaneously.

At a further later point, the master microcontroller unit 102 may transmit another, different selection signal to the register field corresponding to the GPIO 108. This selection signal indicates that the GPIO 108 is now controlled by the master microcontroller unit once more. The master microcontroller unit 102 may transmit selection signals to change the microcontroller unit with control over the GPIO at any point/as required for functioning of the microcontroller system 100.

Figure 2:
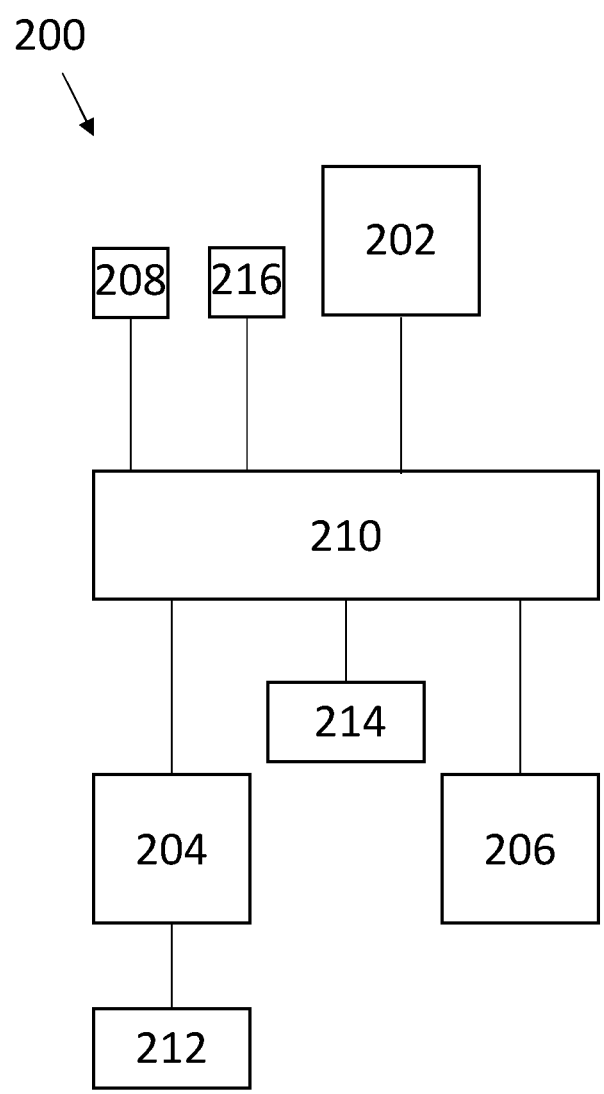
FIG. 2 shows a microcontroller system with a plurality of slave microcontroller and peripherals.

A second exemplary microcontroller system 200 is shown in FIG. 2. The microcontroller system 200 includes a master microcontroller unit 202, two slave microcontroller units 204, 206, a bus 210 and a first GPIO 208. All of these components are similar to those in the microcontroller system 100 shown in FIG. 1. The microcontroller system 200 of FIG. 2 however further comprises a second GPIO 216, and two peripherals 212, 214.

The first peripheral 212 is associated with the first slave microcontroller unit 204. The second peripheral 214 is independent of the slave microcontroller units 204, 206 and may be directly controlled by the master microcontroller.

The master microcontroller unit 202 can transmit a selection signal to the register field corresponding to the first GPIO 208 which indicates that the first GPIO 208 is now controlled by the first slave microcontroller unit 204. The first slave microcontroller unit may then transmit a selection signal which assigns the first GPIO 208 to the first peripheral 212 which forms part of the first slave microcontroller unit 204. The first peripheral 212 then has control over the first GPIO 208. The first peripheral 212 may begin communicating with and controlling the GPIO 208 as a result of reading the active configuration from the master microcontroller unit 202 through a bus interface such as the bus 210 shown in FIG. 2, or as a result of reading the active configuration from the first slave microcontroller unit 204. However, the first slave microcontroller 204 may only read the active configuration at the discretion of the master microcontroller unit 202 and/or the first slave microcontroller unit 204. It may also be possible (although not shown in the embodiments shown in FIG. 2) for the master microcontroller to directly assign control of a GPIO to the first peripheral which comprises part of a slave microcontroller unit 204.

The master microcontroller unit 202 will initially also have control over the second GPIO 216. The master microcontroller unit 202 can transmit a selection signal to the register field corresponding to the second GPIO 216 which indicates that the second GPIO 216 is now controlled by the second slave microcontroller unit 206.

At a later point, the master microcontroller unit may transmit a selection signal to the register field corresponding to the second GPIO 216 which indicates that the first GPIO 216 is now to be controlled by the second peripheral unit 214. The second slave microcontroller unit 206 therefore no longer communicates with the second GPIO 216, and the second peripheral unit 214 communicates with the second GPIO 216.

Figure 3:
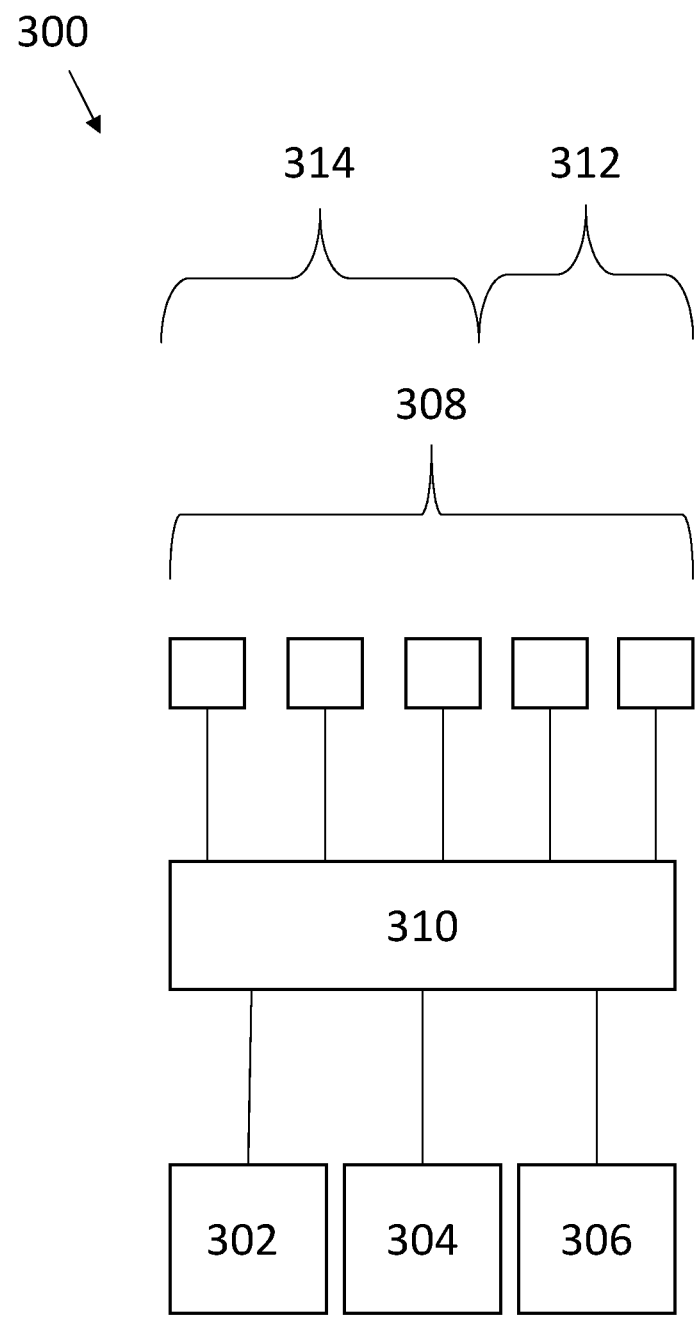
FIG. 3 shows a microcontroller system with an application microcontroller unit acting as the master microcontroller unit.

FIG. 3 shows an exemplary microcontroller system 300 with three microcontroller systems 302, 304, 306. The application microcontroller unit 302 acts as the master microcontroller system. The network microcontroller unit 304 and the digital signal processor microcontroller unit 306 both act as slave microcontroller units.

During 'start-up' or upon reset of the microcontroller system 300, the application microcontroller unit 302 controls (and therefore has access to) a plurality of GPIOs 308. The network microcontroller unit 304 and digital signal processor microcontroller unit 306 remain inactive/disconnected from the plurality of GPIOs 308 during 'start-up' or reset.

After 'start-up' or reset, the application microcontroller unit 302 assigns a subset 314 of the plurality of GPIOs 308 to the network microcontroller unit 304. The network microcontroller unit 304 may then manage external low-noise amplifiers, power amplifiers and the wireless co-existence interface connected to the subset of GPIOs 314.

After 'start-up' or reset, the application microcontroller unit 302 assigns a second subset 312 of the plurality of GPIOs 308 to the digital signal processor microcontroller unit 306. The digital signal processor microcontroller unit 306 may then communicate with an external digital-to-analog converter and pulse-density modulation unit connected to the second subset of GPIOs 312.

The application microcontroller unit 302 will separately communicate with an external power management integrated circuit (not shown) to control the power provided to the microcontroller system 300. By assigning smaller sets of GPIOs 314, 312 to the network microcontroller unit 304 and digital signal processor microcontroller unit 306 respectively, the number of GPIOs 308 through which unintentional bugs or malicious code in the slave microcontroller units 304, 306 can enter the rest of the microcontroller system is reduced (i.e. the 'attack surface' of the microcontroller system is reduced). These unintentional bugs or malicious code can also not tamper with critical components such as the external power management integrated circuit in the arrangement described above, as the external power management integrated circuit remains separated from the plurality of GPIOs 308 and slave microcontroller units 304, 306.

In the configuration seen in FIG. 3, it may not be possible for the network microcontroller unit 304 to read the active configuration of the GPIOs from the application microcontroller unit 302 through a bus interface such as the bus 310. However, in such configurations it would be possible for the information regarding the assignment of control of the GPIOs to be shared through a software based scheme.

Thus it will be appreciated by those skilled in the art that a microcontroller system according to embodiments of the present invention may help to reduce unintentional or malicious GPIO usage, and may help to decrease start-up times associated with the microcontroller system. It will further be appreciated however that many variations of the specific arrangements described herein are possible within the scope of the invention as defined in the claims.

The invention claimed is:

1. A microcontroller system comprising:
a master microcontroller unit;
a plurality of slave microcontroller units; and
a plurality of general purpose inputs/outputs, wherein each of the plurality of general purpose inputs/outputs is operable in a first state and in a second state, wherein:
  in the first state, the general purpose input/output is controlled by the master microcontroller unit; and
  in the second state the general purpose input/output is controlled by one or more slave microcontroller units of the plurality of slave microcontroller units;
wherein the master microcontroller unit is arranged to transmit a selection signal which changes the state of a first general purpose input/output of the plurality of general purpose inputs/outputs; and
wherein a subset of the plurality of general purpose inputs/outputs are excluded from control by a subset of the plurality of slave microcontroller units.

2. A microcontroller system as claimed in claim 1, wherein the microcontroller system is arranged such that the first general purpose input/output is in the first state upon start-up of the microcontroller system.

3. A microcontroller system as claimed in claim 1, wherein the selection signal is written to a register field of the first general purpose input/output.

4. A microcontroller system as claimed in claim 1, wherein when the first general purpose input/output is in the second state, the further module is arranged to have sole control over the first general purpose input/output.

5. A microcontroller system as claimed in claim 1, wherein at least one of the slave microcontroller units comprises a peripheral.

6. A microcontroller system as claimed in claim 1, wherein at least one of the slave microcontroller units comprises a plurality of peripherals.

7. A microcontroller system as claimed in claim 1, wherein at least one of the slave microcontroller units is arranged to transmit an additional selection signal which assigns the control of at least one general purpose input/output to a peripheral.

8. A microcontroller system as claimed in claim 1, wherein the master microcontroller unit is arranged to transmit a selection signal that directly assigns a peripheral control of a general purpose input/output.

9. A microcontroller system as claimed in claim 1, wherein the general purpose input/output assignment is dynamic.

10. A microcontroller system as claimed in claim 1, wherein the first general purpose input/output is used as a clock connection and/or a data connection.

11. A method of controlling a microcontroller system comprising:
controlling a plurality of general purpose inputs/outputs using a master microcontroller unit;
transmitting a selection signal from the master microcontroller unit to a first general purpose input/output of the plurality of general purpose inputs/outputs; and
subsequently controlling the first general purpose input/output using a first slave microcontroller unit of a plurality of slave microcontroller units;
wherein a subset of the plurality of general purpose inputs/outputs are excluded from control by a subset of the slave microcontroller units.

12. A method of controlling a microcontroller system as claimed in claim 11, wherein the method further comprises transmitting a selection signal to assign the first general purpose input/output during an initial configuration.

13. A method of controlling a microcontroller system as claimed in claim 11, wherein the method further comprises assessing whether the first slave microcontroller unit is secure.

14. A method of controlling a microcontroller system as claimed in claim 11, comprising writing the selection signal to a register field of the first general purpose input/output.

15. A method of controlling a microcontroller system as claimed in claim 11, wherein when subsequently controlling the first general purpose input/output using the first slave microcontroller unit, the first slave microcontroller unit has sole control of the first general purpose input/output.

* * * * *